United States Patent Office 3,509,235
Patented Apr. 28, 1970

3,509,235
THERMOSETTING COMPOSITIONS CONTAINING POLYVINYL OXAZINES, OR OXAZOLINES WITH POLYCARBOXYLIC ACIDS
Franz Riemhofer, Wolfgang Seeliger, and Franz Stürzenhofecker, Marl, Germany, assignors to Chemische Werke Huls A.G., Marl, Germany
No Drawing. Filed Sept. 18, 1967, Ser. No. 668,638
Claims priority, application Germany, Sept. 23, 1966, C 40,178
Int. Cl. C08f 33/08; 41/12; C08g 39/10
U.S. Cl. 260—873                                13 Claims

ABSTRACT OF THE DISCLOSURE

Thermosetting compositions of polymers of alkenyl-substituted oxazines or oxazolines in admixture with polycarboxylic acids, said compositions being storable and suitable as vehicles for coating compositions.

---

Applicants hereby claim the benefit of the filing date of West German patent application C 40,178 of Sept. 23, 1966, pursuant to the provisions of 35 U.S.C. 119.

BACKGROUND OF THE INVENTION

This invention relates to synthetic resins, and in particular to mixed resins comprising condensates of an addition polymer of an ethylenically unsaturated derivative of an oxazoline or oxazine, with a polybasic carboxylic acid.

It is known that 4,4-dialkyl-$\Delta^2$-oxazolines and 4,4-dialkyl-5,6-dihydro-4H-1,3-oxazines, substituted in the 2-position by alkenyl residues, particularly by vinyl or isopropenyl residues, can be subjected to free radical polymerization. Likewise conventional is the copolymerization of these oxazoline and dihydro-oxazine derivatives with other ethylenically unsaturated compounds capable of free radical polymerization. The polymers and copolymers are described as utilized, inter alia, for the production of hard, clear, colorless, and glossy coatings (German Patent 1,067,437, U.S. Patents 2,831,858 and 2,897,182, as well as French Patents 1,367,518 and 1,385,727). However, these coatings exhibit a very poor resistance to solvents.

It is also known from J. Org. Chem., 15, 802 (1950) that the oxazoline ring is unstable against acids at elevated temperatures. The ring is split at the oxygen bridge, resulting normally in the N-alkylcarboxylic acid amides substituted in the $\beta$-position of the alkyl residue: with aqueous mineral acids, N-($\beta$-hydroxy-alkyl)-carboxylic acid amides are formed, but with carboxylic acids, there are obtained N-($\beta$-acyloxyalkyl)-carboxylic acid amides.

According to DAS [German published application] 1,050,540, the reaction of bisoxazolines with dicarboxylic acids has been utilized for the preparation of high-molecular weight, linear polycondensates containing carboxylic acid ester and carboxylic acid amide groups. In this process, the reaction of bisoxazolines with dicarboxylic acids has been utilized for the preparation of high-molecular weight, linear polycondensates containing carboxylic acid ester and carboxylic acid amide groups. In this process, the reaction must be conducted with the exclusion of water at high, polyamide-forming temperatures. The resulting products are suitable for the production of fibers and foils.

In the reaction of oxazolines with dicarboxylic acid anhydrides, known from U.S. Patents 2,547,493; 2,547,494; 2,547,495; and 2,547,496, cyclic imido esters are formed. This reaction can also be employed for cross-linking maleic acid anhydride copolymers or adducts of drying oils and maleic acid anhydride. Such a cross-linking reaction is achieved, according to U.S. Patents 2,543,602; 2,547,497; and 2,547,498, by reacting a substance containing several acid anhydride groupings with bisoxazolines. In this reaction, the bisoxazolines react, via ring opening, with the acid anhydride functions, so that the polyanhydride is cross-linked, thereby forming cyclic acid-imido groups.

This cross-linking technique employing bisoxazolines, however, has two disadvantages: firstly, the bisoxazolines are not readily amenable to large scale production; and secondly, the cross-linking reaction takes place at room temperature so rapidly that a varnish composition produced in accordance with such a process would have to be utilized practically at once in order to avoid deleterious changes in the viscosity thereof (see U.S. Patent 2,547,497, column 4, lines 60–73; U.S. Patent 2,543,602, column 5, lines 29–35 and column 7, line 73, to column 8, line 4). These disadvantages, of course, considerably restrict the practical and commercial application of such polymers. This is particularly true in the paint and varnish industry.

SUMMARY OF THE INVENTION

A principal object of this invention is to provide thermosetting compositions which are particularly suitable for the varnish indusrty.

Another object is to provide liquid thermosetting compositions having an extended shelf life.

Other objects are to provide novel compositions and processes for making same.

Upon further study of the specification and claims, other objects and advantages of the present invention will become apparent.

To attain the above objects, there are provided novel thermosetting mixtures comprising:

(a) Polymers of 2-alkenyl-$\Delta^2$-oxazoline derivatives or 2-alkenyl-5,6-dihydro-4H-1,3-oxazine derivatives, obtained by free radical-polymerization, or copolymers of these compounds with other olefinically unsaturated compounds, said polymers and copolymers being produced by free radical catalysts and hereinafter referred to as addition polymers; and (b) Polycarboxylic acids.

DETAILED DISCUSSION OF INVENTION

The 2-alkenyl derivatives employed in this invention are generically described by the following formula:

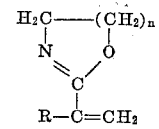

wherein

R represents hydrogen or alkyl of 1–4 carbon atoms; and $n$ represents an integer from one to two, inclusive.

Particularly suitable as the 2-alkenyl derivatives of $\Delta^2$-oxazoline or of 5,6-dihydro-4H-1,3-oxazine are the 2-vinyl- and 2-(1'-alkyl)-vinyl derivatives wherein the alkyl group is of 1–4 carbon atoms. Preferably employed are the 2-vinyl-, 2-isopropenyl-, and 2-(but-1'-en-2'-yl)- $\Delta^2$-oxazolines or -5,6-dihydro-4H-1,3-oxazines. Compounds of this type with free radical catalysts can be readily homopolymerized, the preferred degree of polymerization being about 10 to 500.

Such compounds can also be copolymerized with other ethylenically unsaturated compounds of the formula $H_2C=C$ wherein the unfulfilled valences are satisfied by moieties which do not interfere with the copolymerization reaction. Such monomers preferably contain 4 to 20 carbon atoms, including but not limited to such species mentioned in U.S. Patent 2,897,182, column 10, lines 50–63.

Copolymerization is conducted in a solution in such a manner that polymers are obtained having molecular weights of about 5,000–30,000. Basically, it is possible to copolymerize these 2-alkenyl-$\Delta^2$-oxazolines or -5,6-dihydro-4H-1,3-oxazines at any desired proportion with other ethylenically unsaturated compounds; however, it proved sufficient for obtaining the desired degree of cross-linking to incorporate 10 to 30% by weight of the more expensive oxazoline or oxazine into the copolymer. The incorporation by copolymerization of this amount is thus a preferred embodiment of the present invention.

Details of both homo- and copolymerization are found in U.S. Patent 2,897,182, columns 10 and 11.

As the polycarboxylic acid, it is possible to employ any compound having at least 2 carboxylic acid moieties per molecule. This compound will lead to cross-linking of the polymeric chains of 2-alkenyl oxazoline or oxazine, irrespective of the remaining part of the molecule. Consequently, there is no need to delimit the scope of the polycarboxylic acid usable in this invention. For the purposes of varnish compositions, the polycarboxylic acid and the 2-alkenyl polymer are preferably dissolved in a mutual solvent.

Preferred polycarboxylic acids are aliphatic, cycloaliphatic, and aromatic polybasic carboxylic acids, for example, succinic acid, adipic acid, decanedicarboxylic acid, cyclohexane-1,4-dicarboxylic acid, terephthalic acid, citric acid, tricarballylic acid, trimellitic acid, and pyromellitic acid.

Suitable "polycarboxylic acids" also include polymers and copolymers containing free carboxyl groups, for example polymers of the "Carbopol" series (vinyl carboxy containing polymers). Preferably employed are copolymerizates of acrylic acid or methacrylic acid with other ethylenically unsaturated compounds, for example, with acrylic acid esters, methacrylic acid esters, or styrene. Furthermore suitable are polyesters which contain free carboxyl groups. When polymeric polycarboxylic acids are employed, it is preferred that the polymer have a molecular weight of about 1000 to 50,000, and about 3 to 100 carboxyl groups per molecule. For more details and examples of such polymeric polycarboxylic acids, attention is invited to: Houben-Weyl, Methoden der Organischen Chemie, Band XIV, Teil 1.

It is advantageous to employ the oxazoline- or oxazine-containing polymerizate and the polycarboxylic acid in equivalent amounts, i.e., the proportions of the quantities are to be selected so that one carboxyl group is present for each oxazoline or oxazine ring. However, an excess of reactive groups is harmless with respect to the curing process, a general range being about 1 to 3 free carboxyl groups per 3 to 1 rings.

It is also preferred to select the composition of the carboxyl-group containing polymers, on the one hand, and the oxazoline- or oxazine-containing polymers, on the other hand, so that in equal parts by weight of the two polymers to be mixed, equivalent amounts of carboxyl groups and oxazoline or oxazine rings are contained. Other compositions of the two polymers are, of course, also possible. In any case, the composition of the polymers is adjusted in such a manner that, by suitably combining plasticizing and curing comonomers, mechanical properties are obtained which are desirable for the respective utility of the final product.

Surprisingly, the mixtures of the invention are stable, as such, or also in a dilution with the conventional varnish solvents, at room temperature for at least one week, but in most cases several weeks, without the occurrence of a premature gelling or an undesired increase in viscosity. The cross-linking reaction between the two components of the polymer mixture, i.e., the curing process, takes place only when this mixture is heated to 100–200° C. In this connection, it is unecessary to quantitatively exclude water.

The polymer mixtures of this invention are especially suitable for the production of coatings. For this purpose, solutions of the oxazoline- or oxazine-containing polymerizate and the polycarboxylic acid are mixed in the conventional varnish solvents, pigmented, if desired, applied to the articles to be coated, and baked at about 100–200° C. for 15–60 minutes. Examples of varnish solvents include, but are not limited to benzene, acetone,
toluene, cyclohexanone,
xylene, methylethyl-ketone,
butanole, ethylacetate,
ethyl glycole, butylacetate,
ethylglycole acetate, trichlorethylene, resp. the mixtures thereof.

The glossy films produced by baking at about 100–200° C. have very good mechanical properties. They are, when selecting the polymer composition in the proper manner, hard and at the same time elastic; they adhere very well to the substrate and exhibit an excellent resistance with respect to polar and non-polar solvents, mentioned at the end of paragraph above.

In contradistinction thereto, films produced from the pure oxazoline- or oxazine-containing polymers or from the carboxyl-group containing polymers do not exhibit any practical resistance whatsoever with respect to such solvents.

Without further elaboration, it is believed that one skilled in the art can, using the preceding description, utilize the present invention to its fullest extent. The following preferred specific embodiments are, therefore, to be construed as merely illustrative, and not limitative of the remainder of the specification and claims in any way whatsoever.

In the following examples, all parts are parts by weight.

EXAMPLE 1

(A) Production of a copolymer containing oxazoline rings

Into a mixture of 50 parts of xylene, 50 parts of butanol, and 2 parts of azodiisobutyric acid nitrile, heated to 75° C., there is introduced dropwise within 3 hours a mixture of 50 parts of butyl acrylate, 30 parts of methyl methacrylate, and 20 parts of 2-isopropenyl-$\Delta^2$-oxazoline. Thereafter, the temperature is maintained at 75° C. for an additional 3 hours.

Conversion: 83.4%

K-value [1]: 24 (measured as a 1% by weight solution in cyclohexanone)

Nitrogen content: 3.07%.

(B) Production of a copolymer containing carboxyl groups

A mixture of 50 parts of butyl acrylate, 37 parts of methyl methacrylate, and 13 parts of acrylic acid is polymerized as described in paragraph (A).

Conversion: 100%

K-value: 11.5 (measured as a 1% solution in cyclohexanone)

Content of acrylic acid: 12.35%.

(C) Production and curing of the mixture

A solution of 50 parts of polymerizate (A) and 50 parts of polymerizate (B) in 220 parts of saolvent (xylene-butanol mixture 1:1) is pigmented with 80 parts of titanium dioxide.

From this varnish, films are applied to glass and sheet metal plates, and baked thereon at 130° C. and 180° C., respectively, for 30 minutes. The films exhibit very good adhesion, as well as excellent resistance to solvents, as tested with acetone and a gasoline/benzene mixture. With a varnish thickness of 30–40μ, the pendulum impact test value (according to König) is 140 and 148 seconds, ---
[1] The K-value means a value of the average polymerization degree of a polymer (Fikentscher, Kolloid-Zeitschrift, vol. 49, p. 135 (1929), Cellulosechemie, vol. 13, p. 58 (1932)) (according to DIN 53,726).

respectively, and the cupping test value (according to Erichsen) is 6 and 4.5 mm., respectively.

For comparison purposes, the pure polymers (A) and (B) are pigmented according to the above-mentioned recipe, films are produced from the thus-obtained varnishes, and these films are likewise baked at 130 and 180° C., respectively. The resultant coatings are not resistant against solvents; they dissolve at once in acetone or in a gasoline/benzene mixture.

amounts of the polycarboxylic acids mentioned in the table. (For producing the varnishes II, III, and IV, the carboxylic acid is dissolved in the polymer solution under gentle heating.) The resulting varnishes are baked as in Example 1, and the properties of the resultant films are tabulated in the table.

TABLE

| | I | II | III | IV |
|---|---|---|---|---|
| Polycarboxylic acid | Polymer B from Example 1 | Decanedicarboxylic acid | Adipic acid | Terephthalic acid |
| Resistance against: | | | | |
| Acetone | Excellent | Good | Good | Good |
| Gasoline/benzene | do | Very good | Very good | Very good |
| Pendulum impact hardness (sec.) after baking: | | | | |
| At 130° C | 126 | 58 | 111 | 117 |
| At 180° C | 133 | 66 | 124 | 129 |
| Erichsen cupping test value mm. after baking: | | | | |
| At 130° C | 6.5 | 9.5 | 8.0 | 7.5 |
| At 180° C | 5.0 | 8.0 | 6.5 | 6.0 |

EXAMPLE 2

(A) Production of a copolymer containing oxazoline rings

A mixture of 50 parts of butyl acrylate, 40 parts of methyl methacrylate, and 10 parts of 2-isopropenyl-$\Delta^2$-oxazoline is polymerized as set forth in Example 1.

Conversion: 99%
K-value: 27.5 (measured as a 1% solution in cyclohexanone)
Nitrogen content: 1.69%.

(B) Production of a copolymer containing carboxyl groups

A mixture of 50 parts of butyl acrylate, 43.5 parts of methyl methacrylate, and 6.5 parts of acrylic acid is polymerized as set out in Example 1.

Conversion: 100%
K-value: 18 (measured as a 1% solution in cyclohexanone)
Acrylic acid content: 6.2%.

(C) Production and curing of the mixture

A varnish is prepared from equal parts of polymerizates (A) and (B), as described in Example 1. This varnish also results in films of good adhesion and solvent resistance, under the previously indicated curing conditions. The pendulum impact test values are 92 (105) seconds, and the Erichsen cupping test values are 10 (8) mm.

Comparative films made of the pure polymers (A) and (B) are readily dissolved in acetone or in a gasoline/benzene mixture.

EXAMPLE 3

(A) Production of a copolymer containing oxazoline rings

A mixture of 50 parts of butyl acrylate, 30 parts of methyl methacrylate, and 20 parts of 2-isopropenyl-$\Delta^2$-oxazoline is polymerized as described in Example 1. In this case, however, after the monomer mixture has been added dropwise, the reaction mixture is heated for another 9 hours to 75° C., and after 6 hours of reaction time, 1 part of azodiisobutyric acid nitrile is additionally admixed thereto.

Conversion: 100%
K-value: 25 (measured as a 1% solution in cyclohexanone)
Nitrogen content: 2.84%.

(B) Four different polycarboxylic acids are set forth in the table (C) Production and curing of the mixture From the thus-obtained polymer solution of step (A), varnish films are produced by mixing same with equivalent

EXAMPLE 4

(A) Production of a copolymer containing oxazoline rings

A mixture of 50 parts of methyl methacrylate, 35 parts of butyl acrylate, and 15 parts of 2-isopropenyl-$\Delta^2$-oxazoline is polymerized in the manner disclosed in Example 1.

Conversion: 100%
K-value: 24.5 (measured as a 1% solution in cyclohexanone)
Nitrogen content: 2.01%.

(B) Production of a copolymer containing carboxyl groups

A mixture of 50 parts of methyl methacrylate, 40 parts of butyl acrylate, and 10 parts of acrylic acid is polymerized as in Example 1.

Conversion: 100%
K-value: 28.5 (measured as a 1% solution in cyclohexanone)
Acrylic acid content: 9.8%.

(C) Production and curing of the mixture

As described in Example 1, a varnish is produced from equal amounts of polymerizates (A) and (B), resulting under the above-mentioned curing conditions, in films having good adhesion and excellent solvent resistance. The pendulum impact hardness values are 151 (151) seconds, and the Erichsen cupping test value is 7 (5.5) mm.

EXAMPLE 5

(A) Production of a copolymer containing oxazoline rings

A mixture of 50 parts of styrene, 35 parts of butyl acrylate, and 15 parts of 2-isopropenyl-$\Delta^2$-oxazoline is polymerized as described in Example 3.

Conversion: 97%
K-value: 25 (measured as a 1% solution in cyclohexanone)
Nitrogen content: 2.18%.

(B) Production of a copolymer containing carboxyl groups

A mixture of 50 parts of styrene, 40 parts of butyl acrylate, and 10 parts of acrylic acid is added dropwise within 3 hours to a mixture of 50 parts of xylene, 50 parts of butanol, and 2 parts of azodiisobutyric acid nitrile, heated to 75° C. After the addition of the monomer mixture is terminated, the reaction mixture is heated for another 9 hours, to 75° C., and after 6 hours of reaction time, 1 part of azodiisobutyric acid nitrile is additionally introduced.

Conversion: 95%
K-value: 26.5 (measured as a 1% solution in cyclohexanone)
Acrylic acid content: 9.5%.

(C) Production and curing of the mixture

A varnish is produced from equal amounts of the polymerizates (A) and (B), as in Example 1, which varnish, under the above-mentioned curing conditions, results in films exhibiting good adhesion and resistance to solvents. The pendulum impact hardness values are 175 (181) seconds, and the Erichsen cupping test values are 8 (7) mm.

EXAMPLE 6

(A) Production of a copolymer containing oxazoline rings

A mixture of 84 parts of styrene, 16 parts of 2-isopropenyl-$\Delta^2$-oxazoline, and 2 parts of azodiisobutyric acid nitrile is added dropwise within 3 hours to 100 parts of xylene, maintained at 75° C. After 7 hours, one part of initiator is added, and the reaction mixture is polymerized for a total of 22 hours.

Conversion: 97%
K-value: 18 (measured as a 1% solution in cyclohexanone)
Nitrogen content: 2.13%.

(B) Production of a copolymer containing carboxyl groups

A mixture of 91 parts of butyl acrylate and 9 parts of acrylic acid is polymerized, as described in Example 1, in a mixture of 75 parts of xylene and 25 parts of butanol.

Conversion: 98%
K-value: 24 (measured as a 1% solution in cyclohexanone)
Acrylic acid content: 9.15%.

(C) Production and curing of the mixture

From polymerizates (A) and (B), at a proportion of 1:1.15, a varnish is produced as described in Example 1, resulting, under the above-mentioned curing conditions, in films having a good adhesion and solvent resistance. The pendulum impact hardness values are 105 (120) seconds, and the Erichsen cupping test values are 9.5 (8.5) mm.

EXAMPLE 7

(A) Production of a copolymer containing oxazine rings

A mixture of 50 parts of methyl methacrylate, 30 parts of butyl acrylate, and 20 parts of 2-vinyl-5,6-dihydro-4H-1,3-oxazine is polymerized as set forth in Example 1.

Conversion: 100%
K-value: 30 (measured as a 1% solution in cyclohexanone)
Nitrogen content: 2.98%.

(B) Production of a copolymer containing carboxyl groups

A mixture of 50 parts of methyl methacrylate, 37.0 parts of butyl acrylate, and 13 parts of acrylic acid is polymerized as set forth in Example 1.

Conversion: 100%
K-value: 29 (measured as a 1% solution in cyclohexanone)
Acrylic acid content: 12.41%.

(C) Production and curing of the mixture

As in Example 1, a varnish is produced from equal amounts of polymerizates (A) and (B), resulting, under the above-mentioned curing conditions, in films exhibiting good adhesion and solvent resistance. The pendulum impact hardness values are 158 (163) seconds, and the Erichsen cupping test values are 9 (8) mm.

EXAMPLE 8

(A) Production of a poly-(2-isopropenyl-$\Delta^2$-oxazoline)

One hundred parts of 2-isopropenyl-$\Delta^2$-oxazoline are heated together with 50 parts of xylene, 50 parts of butanol, and 2 parts of azodiisobutyric acid nitrile for 12 hours to 75° C.

Conversion: 82.9%
K-value: 18.0 (measured as a 1% solution in cyclohexanone)
Nitrogen content: 11.60%.

(B) Step (B) of Example 4 is repeated (C) Production and curing of the mixtures with different polycarboxylic acids (1) From 200 parts of the polymer solution obtained according to (A), 15.5 parts of 1,10-decanedicarboxylic acid, 69 parts of titanium dioxide, and 175.5 parts of a solvent (xylene-butanol mixture, 1:1), a varnish is produced which is applied to glass and sheet metal plates and baked at 130° C. and 180° C., respectively, for 30 minutes. The films exhibit a very good solvent resistance with respect to acetone and a gasoline/benzene mixture, and have pendulum impact hardness values of 154 (157) seconds, with Erichsen cupping test values of 4 (3.5) mm.

(2) From 30 parts of the polymer solution obtained according to (A), 200 parts of the polymer solution obtained according to (B) in Example 4, 69 parts of titanium dioxide, and 161 parts of solvent (xylene/butanol mixture, 1:1), a varnish is produced which is applied to glass and sheet metal plates and baked for 30 minutes at 130° C. and 180° C., respectively. The resulting films exhibit an excellent solvent resistance against acetone and a gasoline/benzene mixture, and have pendulum impact hardness values of 140 (145) seconds, with Erichsen cupping test values of 5 (4.5) mm.

EXAMPLE 9

(A) Production of a copolymer containing oxazoline rings

A mixture of 50 parts of methyl methacrylate, 35 parts of butyl acrylate, and 15 parts of 2-isopropenyl-$\Delta^2$-oxazoline is polymerized as disclosed in Example 1.

Conversion: 100%
K-value: 24.5 (measured as a 1% solution in cyclohexanone)
Nitrogen content: 2.01%

(B) Production of a polyester containing carboxyl groups

A mixture of 192 parts of trimellitic acid anhydride, 592 parts of phthalic acid anhydride, and 360 parts of butanediol-1,3 is heated for 12 hours to 180° C., with a nitrogen stream being conducted through the reaction mixture. The resulting polyester has an acid number of 129. This ester is dissolved in the same quantity by weight of a mixture of equal parts of xylene and butanol, so that a 50% solution is obtained.

(C) Production and curing of the mixture

From 100 parts of the polyester solution obtained according to (B), 170 parts of the polymer solution obtained according to (A), 81 parts of titanium dioxide, and 189 parts of a solvent (xylene/butanol mixture, 1:1), a varnish is produced which is applied to glass and sheet metal plates and baked thereon for 30 minutes at 130° C. and 180° C., respectively. The varnish films exhibit an excellent solvent resistance against acetone and a gasoline/benzene mixture, and pendulum impact hardness values of 146 (146) seconds, with Erichsen cupping test values of 7.5 (8) mm.

The preceding examples can be repeated with similar success by substituting the generically and specifically described reactants and operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:
1. A thermosetting composition comprising:
    (A) an addition polymer of at least about 10% by weight of a monomer of the formula

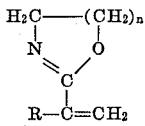

wherein
R represents hydrogen or alkyl of 1–4 carbon atoms; and
$n$ represents an integer from one to two, inclusive, and
    (B) a polycarboxylic acid, having at least 2 carboxylic acid moieties per molecule selected from the group consisting of aliphatic, cycloaliphatic and aromatic monomeric carboxylic acid, a polymer of an ethylenically unsaturated carboxylic acid, and a polyester containing free carboxylic acid groups;
the proportion of (A) to (B) being such that there are about 1 to 3 free carboxyl groups per 3 to 1 pendant oxazine or oxazoline rings.

2. A composition as defined by claim 1 wherein said polymer comprises a copolymer of said monomer, the remainder being another polymerizable vinylidene compound.

3. A composition as defined by claim 2 wherein said copolymer comprises 10–30% of said monomer.

4. A composition as defined by claim 1 wherein said polycarboxylic acid is selected from the group consisting of a copolymer of an ethylenically unsaturated carboxylic acid and another ethylenically unsaturated monomer and a polyester containing free carboxylic acid groups.

5. A composition as defined by claim 1 wherein said polymer is selected from the group consisting of a copolymer of butyl acrylate, methyl methacrylate, and 2-isopropenyl-Δ²-oxazoline, a copolymer of styrene and 2-isopropenyl-Δ²-oxazoline, and a copolymer of methyl methacrylate, butyl acrylate, and 2-vinyl-5,6-dihydro-4H-1,3-oxazine.

6. A composition as defined by claim 5 wherein the polycarboxylic acid is selected from the group consisting of a copolymer of butyl acrylate, methyl methacrylate and acrylic acid; decanedicarboxylic acid; adipic acid; a copolymer of styrene, butyl acrylate, and acrylic acid; a copolymer of butyl acrylate and acrylic acid, and a polyester of trimellitic acid anhydride and butanediol-1,3, there being an excess of anhydride.

7. A varnish comprising a solvent and dissolved therein a composition as defined by claim 1.

8. A method of coating a substrate, said method comprising applying a varnish as defined by claim 7 and baking the resultant film at 100–200° C.

9. A solid thermoset reaction product obtained by reacting (A) and (B) of claim 1.

10. A solid thermoset reaction product obtained by reacting the components of the composition as defined by claim 6.

11. A composition as defined by claim 1 wherein (A) is a homopolymer having a degree of polymerization of about 10 to 500.

12. A composition as defined by claim 1 wherein (B) is polymeric and has a molecular weight of about 1000 to 50,000 and about 3–100 carboxyl groups per molecule.

13. A composition as defined by claim 1, wherein (A) and (B) are substantially equal in weight and contain equivalent amounts of oxazoline or oxazine rings, and carboxyl groups respectively.

References Cited

UNITED STATES PATENTS

| | | | |
|---|---|---|---|
| 2,543,602 | 2/1951 | Rowland | 260—78.5 |
| 2,547,493 | 4/1951 | Rowland | 260—101 |
| 2,547,494 | 4/1951 | Rowland | 260—326.5 X |
| 2,547,495 | 4/1951 | Rowland | 260—326 |
| 2,547,496 | 4/1951 | Rowland | 260—326.5 |
| 2,547,497 | 4/1951 | Rowland | 260—101 |
| 2,547,498 | 4/1951 | Rowland | 260—18 |
| 2,831,858 | 4/1958 | Benneville | 260—244 |
| 2,897,182 | 7/1959 | Benneville | 260—85.5 |
| 2,968,657 | 1/1961 | Perry | 260—244 |
| 3,284,414 | 11/1966 | Lashua | 260—895 |

FOREIGN PATENTS

| | | |
|---|---|---|
| 1,367,518 | 6/1964 | France. |
| 1,385,727 | 12/1964 | France. |
| 1,050,540 | 2/1959 | Germany. |
| 1,067,437 | 10/1959 | Germany. |

OTHER REFERENCES

Journal of Organic Chemistry 15, p. 802 (1950).

MURRAY TILLMAN, Primary Examiner

P. LIEBERMAN, Assistant Examiner

U.S. Cl. X.R.

260—895, 78.4, 80.3, 88.3, 244, 33.6, 33.4, 31.2, 32.8, 33.8, 80.73, 80.72

UNITED STATES PATENT OFFICE
CERTIFICATE OF CORRECTION

Patent No. 3,509.235         Dated April 28, 1970

Inventor(s) FRANZ RIEMHOFER, et al

It is certified that error appears in the above-identified patent and that said Letters Patent are hereby corrected as shown below:

Column 1, Line 57, after "groups" delete remainder of line. Delete Lines 58, 59, 60 and "ester and carboxylic acid amide groups" on Line 61.

SIGNED AND
SEALED
OCT 13 1970

(SEAL)
Attest:

Edward M. Fletcher, Jr.
Attesting Officer

WILLIAM E. SCHUYLER, JR.
Commissioner of Patents